(12) United States Patent
Tofighbakhsh (10) Patent No.: US 10,841,509 B2
(45) Date of Patent: Nov. 17, 2020

(54) CAMERA ARRAY ORCHESTRATION

(71) Applicant: AT&T Intellectual Property I, L.P., Atlanta, GA (US)

(72) Inventor: Mostafa Tofighbakhsh, Cupertino, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/166,431

(22) Filed: Oct. 22, 2018

(65) Prior Publication Data
US 2020/0128193 A1 Apr. 23, 2020

(51) Int. Cl.
*H04N 5/247* (2006.01)
*H04N 5/232* (2006.01)
(Continued)

(52) U.S. Cl.
CPC ......... *H04N 5/247* (2013.01); *G06F 9/45558* (2013.01); *G06N 20/00* (2019.01);
(Continued)

(58) Field of Classification Search
CPC .... H04N 5/247; H04N 5/23218; G06N 20/00; G06F 9/45558
See application file for complete search history.

(56) References Cited

U.S. PATENT DOCUMENTS 5,729,471 A * 3/1998 Jain .................... H04N 13/139
725/131
5,841,469 A 11/1998 Freeman et al.
(Continued)

FOREIGN PATENT DOCUMENTS

EP 3348026 3/2017
WO WO 2016026516 2/2016
(Continued)

OTHER PUBLICATIONS

Wang et al., "Elastic Urban Video Surveillance System Using Edge Computing," Proceedings of the Workshop on Smart Internet of Things, Oct. 14, 2017, ACM 2017.
Anadiotis et al., "SD-WISE: A Software-Defined Wireless SEnsor network," Oct. 25, 2017, retrieved at https://arxiv.org/pdf/1710.09147.pdf.
Wang et al., "GENI Cinema: A SDN-Assisted Scalable Live Video Streaming Service," IEEE 22$^{nd}$ International Conference on Network Protocols (ICNP), Oct. 21-24, 2014, pp. 529-532, IEEE 2014.
(Continued)

*Primary Examiner* — Jamie J Atala
*Assistant Examiner* — Michael Robert Cammarata
(74) *Attorney, Agent, or Firm* — Hartman & Citrin LLC (57) ABSTRACT

The concepts and technologies disclosed herein are directed to camera array orchestration. In accordance with one aspect disclosed herein, a camera array orchestration system can learn, based upon a trigger received from a camera array including at least two camera nodes, of at least one media object to be captured during an event. The trigger can include data that identifies the media object. The camera orchestration system can generate an inference with regard to an action to be taken by at least one camera node in the camera array with respect to capturing the media object during the event. The camera orchestration system can send the inference to the camera array. The camera orchestration system can check a camera orchestration database for a policy associated with the media object identified by the data included in the trigger. The inference can be generated, at least in part, based upon the policy.

20 Claims, 8 Drawing Sheets

(51) Int. Cl.
*G06F 9/455* (2018.01)
*G06N 20/00* (2019.01)
*H04N 7/18* (2006.01)

(52) U.S. Cl.
CPC ......... *H04N 5/23218* (2018.08); *H04N 7/181* (2013.01); *G06F 2009/45583* (2013.01)

(56) References Cited

U.S. PATENT DOCUMENTS

| | | | | |
|---|---|---|---|---|
| 5,850,352 | A * | 12/1998 | Moezzi | H04N 13/139 345/419 |
| 6,144,375 | A * | 11/2000 | Jain | G11B 27/105 715/251 |
| 10,003,762 | B2 * | 6/2018 | Jung | G06F 16/51 |
| 10,142,540 | B1 * | 11/2018 | Ribeiro | H04N 5/23238 |
| 10,416,667 | B2 * | 9/2019 | Berestov | H04N 5/23203 |
| 2006/0197839 | A1 * | 9/2006 | Senior | H04N 5/232 348/169 |
| 2010/0020068 | A1 * | 1/2010 | House | G06T 15/20 345/419 |
| 2013/0106989 | A1 | 5/2013 | Gage et al. | |
| 2014/0168477 | A1 * | 6/2014 | David | G06Q 30/0601 348/240.2 |
| 2014/0267714 | A1 | 9/2014 | Mistry et al. | |
| 2014/0270706 | A1 * | 9/2014 | Pasko | H04N 21/21805 386/278 |
| 2015/0195324 | A1 | 7/2015 | Kim | |
| 2015/0263963 | A1 * | 9/2015 | Minakuchi | H04L 47/34 370/392 |
| 2015/0288622 | A1 | 10/2015 | Fargano et al. | |
| 2016/0014435 | A1 * | 1/2016 | Cronin | H04N 5/247 725/82 |
| 2016/0073010 | A1 * | 3/2016 | Cronin | G06Q 10/00 705/39 |
| 2016/0088286 | A1 * | 3/2016 | Forsythe | G06F 16/24575 348/46 |
| 2016/0261808 | A1 * | 9/2016 | Tojo | H04N 5/23229 |
| 2016/0322078 | A1 * | 11/2016 | Bose | G11B 27/031 |
| 2016/0330140 | A1 | 11/2016 | Cook et al. | |
| 2017/0048308 | A1 | 2/2017 | Qaisar | |
| 2017/0094259 | A1 * | 3/2017 | Kouperman | H04N 13/111 |
| 2017/0097842 | A1 | 4/2017 | Bugenhagen | |
| 2017/0178687 | A1 | 6/2017 | Tamir et al. | |
| 2017/0264999 | A1 * | 9/2017 | Fukuda | H04N 5/2252 |
| 2018/0007521 | A1 * | 1/2018 | Meredith | H04W 4/08 |
| 2018/0018508 | A1 | 1/2018 | Tusch | |
| 2018/0063422 | A1 * | 3/2018 | Liu | H04N 5/23225 |
| 2018/0124254 | A1 | 5/2018 | Shaw et al. | |
| 2018/0139129 | A1 | 5/2018 | Dowlatkhah et al. | |
| 2018/0167927 | A1 | 6/2018 | Beattie, Jr. et al. | |
| 2018/0191679 | A1 | 7/2018 | Mulka et al. | |
| 2018/0199207 | A1 | 7/2018 | Zavesky et al. | |
| 2018/0227572 | A1 * | 8/2018 | King | H04N 5/23238 |
| 2018/0270427 | A1 * | 9/2018 | Damstra | H04N 5/232 |
| 2018/0332218 | A1 * | 11/2018 | Yoshimura | H04N 5/23232 |
| 2019/0289275 | A1 * | 9/2019 | Arai | H04N 13/111 |

FOREIGN PATENT DOCUMENTS

| | | |
|---|---|---|
| WO | WO 2016153478 | 9/2016 |
| WO | WO 2017186916 | 11/2017 |
| WO | WO 2018024809 | 2/2018 |
| WO | WO 2018066744 | 4/2018 |
| WO | WO 2018100437 | 6/2018 |

OTHER PUBLICATIONS

Faragardi et al., "An Efficient Placement of Sinks and SDN Controller Nodes for Optimizing the Design Cost of Industrial IoT Systems," Software Practice and Experience, May 2018.

Mangiante et al., "VR is on the Edge: How to Deliver 360° Videos in Mobile Networks," Proceedings of the Workshop on Virtual Reality and Augmented Reality Network, Aug. 25, 2017, ACM 2017.

Harish et al., "Smart Video Surveillance," International Journal of Emerging Engineering Research and Technology, Jan. 2015, vol. 3, Issue 1, pp. 109-112.

Wilburn et al., "High Performance Imaging Using Large Camera Arrays," ACM Transactions on Graphics, Jul. 2005, vol. 24, No. 3, pp. 765-776.

Bernstein et al., "Analytic Methods for Optimizing Realtime Crowdsourcing," Collective Intelligence Conference 2012, Apr. 13, 2012.

Sandar et al., "Cloud-Based Video Monitoring Framework: An Approach Based on Software-Defined Networking for Addressing Scalability Problems," 15th International Workshops on Web Information Systems Engineering (WISE 2014), Oct. 12-14, 2014, pp. 176-189.

Latif et al., "SmartArgos: Improving mobile surveillance systems with software defined networks," 2015 IEEE Conference on Communications and Network Security, Sep. 28-30, 2015.

Lopez et al., "A Software-Defined Networking Framework to Provide Dynamic QoS Management in IEEE 802.11 Networks," Sensors, Jul. 12, 2018.

Thiele et al., "Formal Analysis Based Evaluation of Software Defined Networking for Time-Sensitive Ethernet," Proceedings of the 2016 Conference on Design, Automation & Test in Europe, Mar. 14-18, 2016, pp. 31-36.

* cited by examiner

CAMERA ARRAY ORCHESTRATION

BACKGROUND

Today, with the advent of inexpensive digital image sensors, imaging systems, such as those used in everything from smartphone cameras to professional video cameras, often incorporate multiple digital image sensors. Some cameras utilize a separate image sensor for red, green, and blue (or "RGB") light ranges, while others, as is the case with high-end smartphones, rely on multiple digital image sensors to enable camera effects (e.g., Bokeh). Camera arrays combine multiple sensors for capturing high resolution images, high dynamic range ("HDR") images, large field-of-view images, and special effects such as what is commonly known as "bullet-time."

The practical applications for camera arrays are numerous. One application is recording live events that can benefit from multiple camera angles. For example, a football game requires several different angles to produce a quality product for television and to ensure multiple angles are available for official reviews, such as when a play is challenged. Even with professional videographers manning the video recorders, it is difficult to coordinate cameras within arrays to achieve the best angles and camera settings for all situations that might occur during a live event.

SUMMARY

According to one aspect of the concepts and technologies disclosed herein, a camera array orchestration system can include a processor and memory. In some embodiments, the processor and the memory are physical hardware resources of a cloud environment. In other embodiments, the processor and the memory are virtualized hardware resources executed by physical hardware resources of the cloud environment. The camera array orchestration system can learn, based upon one or more triggers received from a camera array that includes at least two camera nodes, of a media object to be captured for an event. The camera array orchestration system can generate an inference with regard to an action to be taken by at least one camera node in the camera array with respect to capturing the media object during the event. The camera array orchestration system can send the inference to the camera array. The trigger can include data that identifies the media object. The camera array orchestration system can check a camera orchestration database for one or more policies associated with the media object identified by the data. The camera array orchestration system can generate the inference based, at least in part, upon the policy(ies). In some embodiments, the camera array orchestration system can use a camera orchestration inference engine, including a machine learning system, to generate the inference based, at least in part, upon the policy(ies).

A camera node in the camera array can receive the inference from the camera array orchestration system. The camera node can create a new action table or update an existing action table to accommodate the inference with regard to the action to be taken with respect to capturing the media object during the event. The camera node can execute the action in the action table. The camera node can share, with at least one additional camera node in the camera array, a camera ID that identifies the camera node, a camera state of the camera node, and at least one additional trigger. The camera node also can share the camera ID, the camera state, and the additional trigger(s) with the camera array orchestration system. The camera array orchestration system can update the inference based upon the at least one additional trigger.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

Figure 1:
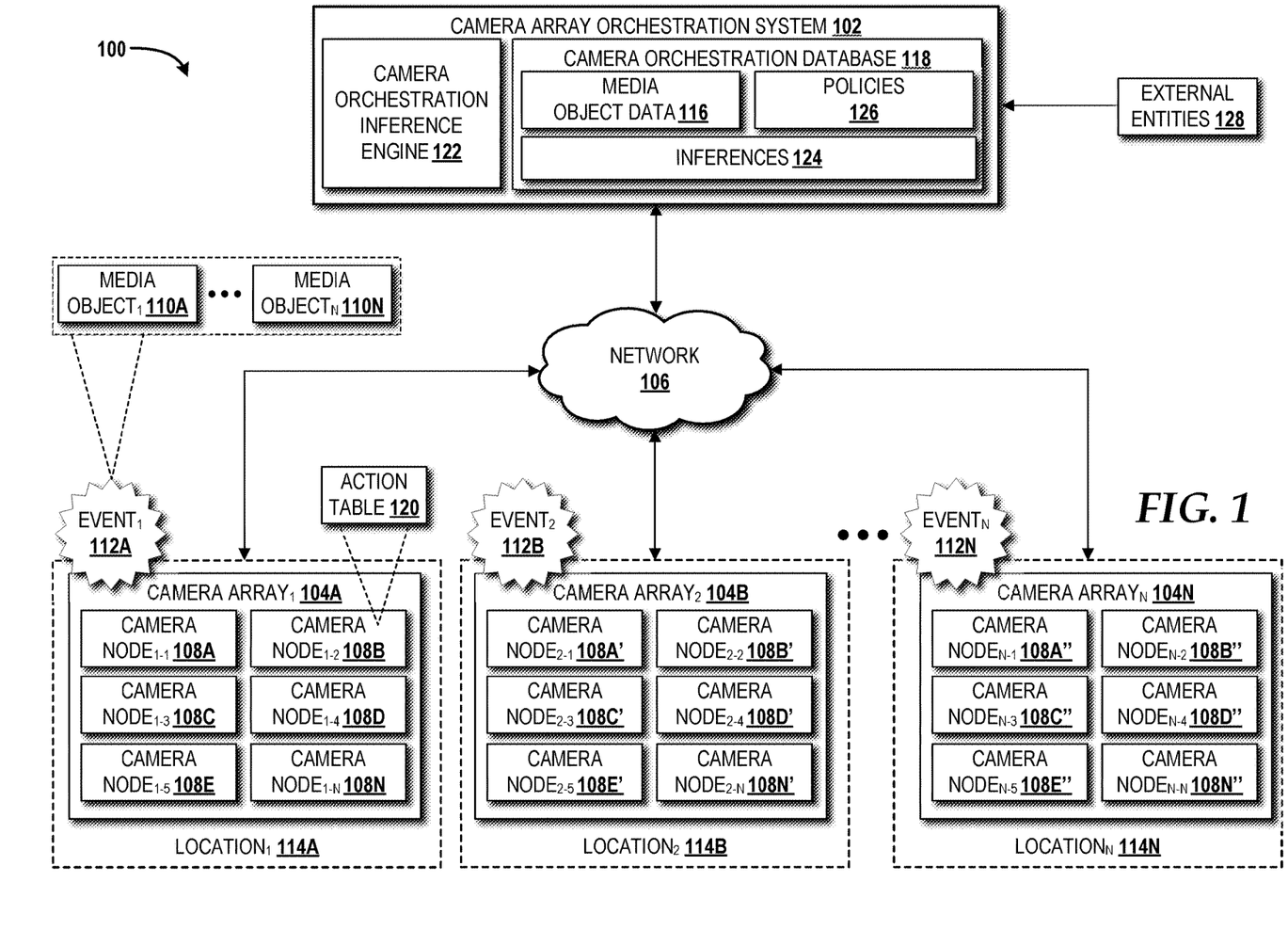
FIG. 1 is a block diagram illustrating aspects of an operating environment capable of implementing aspects of the embodiments disclosed herein.

Turning now to FIG. 1, a block diagram illustrating aspects of an operating environment 100 in which the concepts and technologies disclosed herein can be implemented will be described. The illustrated operating environment 100 includes a camera array orchestration system 102 operating in communication with camera arrays 104A-104N (herein also referred to as camera arrays 104 and in the singular as a camera array 104) via a network 106. The camera array orchestration system 102 uses machine learning techniques to achieve artificial intelligence for orchestrating control of a plurality of camera nodes 108A-108N (herein also referred to as camera nodes 108 and in the singular as a camera node 108) in the camera arrays 104A-104N to capture media objects 110A-110N (herein also referred to as capture media objects 110 and in the singular as a capture media object 110) associated with events 112A-112N (herein also referred to as events 112 and in the singular as an event 112) that occur within locations 114A-114N (herein also referred to as locations 114 and in the singular as a location 114) served by the camera arrays 104A-104N. Although three locations 114, each served by one camera array 104 to capture media objects 110 associated with one event 112, are illustrated, the concepts and technologies disclosed herein are suitable for implementations in which the camera array orchestration system 102 orchestrates control of any number of camera arrays 104 serving any number of locations 114 to capture media objects 110 associated with any number of events 112, as will be apparent from the examples disclosed herein.

As used herein, a "media object" 110 encompasses anything associated with an event 112 that can be visually-captured by at least one camera node 108 in a camera array 104. The events 112 can be any type of event, some examples of which include, but are not limited to, sporting events, concerts, other live events, parties, meetings, gatherings, and the like. More generally, the events 112 can include any occurrence for which one or more media objects 110 can be visually-captured by at least one camera node 108 in at least one camera array 104. The locations 114 are representative of where the events 112 occur. By way of example, and not limitation, if the event 112 includes a soccer game, the media objects 110 can include: players, coaches, referees, linesmen, attendees, broadcasters, mascots, any other person or animal within the location 114 during the event 112; and/or balls, uniforms, cleats, shin guards, gloves, linesmen flags, flag markers (e.g., corner kick flag), goals, lights, attendee seating, field (or portion thereof), stadium, and any other inanimate object within the location 114 during the event 112. The scope of what defines a media object 110 can vary depending upon the type of event 112 and the specific implementation of the camera array orchestration system 102. In some implementations, a given event 112, such as a soccer game, might include broadly-scoped media objects 110, such as each team (including coach and staff), the officiating group (e.g., referee(s) and linesmen), and the attendees, or more specific media objects 110, such as each player, each individual of the officiating group, or each attendee or group of attendees (e.g., the attendees in a certain section of a stadium).

Media object data 116 associated with the media objects 110 can be stored in a camera orchestration database 118 associated with the camera array orchestration system 102. The media object data 116 can include metadata that summarizes what represents the media objects 110. The media object data 116 can include media object identifiers or signatures used to uniquely identify individual media objects 110 (e.g., a specific player) or groups of media objects (e.g., all players on a team), associations between types of media objects 110 and types of events 112, associations between specific media objects 110 and specific events 112, associations among different media objects 110 (e.g., a combined media object of a player and a ball), and any other data that describes, at least in part, the media objects 110 and/or any associations the media objects 110 might have with other aspects of the events 112. The media object data 116 can be stored as text, audio, still images, video, or some combination thereof. Still images, for example, can be used by the camera array orchestration system 102, alone or in combination with other machine learning systems, such as an image recognition system (not shown), to determine suitable equivalents for the media objects 110. For example, an image of a ball captured during one event 112 might be used to identify object(s) as ball(s) during other events 112. This example, although simple, illustrates the concept of using the machine learning capabilities of the camera array orchestration system 102 to identify the same type of media objects 110 among multiple distinct events 112.

Each of the illustrated camera arrays 104A-104N includes six camera nodes 108A-108N. In practice, the camera array 104 can include any number of camera nodes 108. Single camera nodes 108 that are not part of any camera array 104 are also contemplated. Each of the camera nodes 108 can be configured to capture still images and/or video. The camera nodes 108 can utilize one or more image sensors based upon charge coupled device ("CCD") or complementary metal oxide semiconductor ("CMOS") image sensor technologies. The camera nodes 108 can include additional sensors, such as, for example, a light sensor for sensing ambient light levels or an orientation sensor for image stabilization. The camera nodes 108 can include flash components to aid in taking pictures in low-light environments. Each of the camera nodes 108 can include one or more designated processing components. Alternatively, the camera nodes 108 can be controlled by one or more centralized processing components of the camera array 104. Processing components for sub-groups of the camera nodes 108 within the camera array 104 are also contemplated. Regardless of the processing architecture, the processing components can execute computer-readable instructions written in software code to perform camera operations and/or to adjust camera settings as described herein. Moreover, certain machine learning processes can be offloaded by the camera array orchestration system 102 to the camera array 104, a controller thereof, or to individual camera nodes 108 if such a configuration is desirable for a particular implementation.

The camera node$_{1-2}$ 108B (i.e., the $2^{nd}$ camera node in the $1^{st}$ camera array) illustrates an action table 120 used by the camera node$_{1-2}$ 108B to identify camera action(s) to be taken for the media objects 110 during capture in association with the event$_1$ 112A occurring in the location$_1$ 114A. The camera actions can include pan-tilt-zoom controls, timing information (e.g., when a camera node 108 should begin and end capture of the media object(s) 110), and camera settings, such as aperture, ISO, and shutter speed, and the like. Other actions to control operations of the camera node$_{1-2}$ 108B can be included in the action table 120. Each of the camera nodes 108 can include an action table 120 specific to each of the camera nodes 108. Alternatively, the camera array 104 can include an action table 120 that details camera actions for all camera nodes 108 in the camera array 104.

In some embodiments, the camera nodes 108 can each maintain an analytics layer to collect alarms, counters, and statistics. In some other embodiments, the camera nodes 108 can maintain a distributed analytics data store that contains alarms, counters, and statistics collected from a collective of all or a group of two or more of the camera nodes 108.

The illustrated camera array orchestration system 102 includes a camera orchestration inference engine 122 and the camera orchestration database 118 (introduced above). The camera orchestration inference engine 122 uses machine learning techniques to generate inferences 124 about the media objects 110 based upon the media object data 116 and policies 126. In particular, the camera orchestration inference engine 122 can train a machine learning model using a training dataset, such as the media object data 116 (either observed or pre-loaded), and use the resulting trained model to generate the inferences 124. The camera orchestration inference engine 122 can classify the media objects 110 and can learn normal and abnormal behaviors of the media objects 110. The information learned about the object range of behaviors can be used to optimize behaviors of the camera arrays 104 during future trigger opportunities (see "triggers" in FIG. 2) with closed feedback loops. An example machine learning system 600 that can be used by the camera orchestration inference engine 122 is illustrated and described herein with reference to FIG. 6.

The inferences 124 generated by the camera orchestration inference engine 122 can be used by the camera array orchestration system 102 to create actions for inclusion in the action tables 120. Alternatively, the inferences 124 can be sent to the camera array(s) 104 or one or more camera nodes 108 depending upon implementation, which then create actions for inclusion in the action tables 120.

The inferences 124 can be generated in consideration of the policies 126. For example, the policies 126 can bias the machine learning model to conform to policy specifications. The policies 126 can be defined for specific media objects 110, media object 110 types, specific events 112, types of events 112, locations 114, camera arrays 104, or camera nodes 108. The policies 126 can be defined based upon policy specifications provided by one or more external entities 128, including individuals, companies, service providers, social networks, combinations thereof, and the like. The policies 126 can include specifications of the actions to be performed by the camera arrays 104 and/or camera nodes 108. The actions can be specific (e.g., specific pan-tilt-zoom and other camera settings), such as included in the action table 120, or generic actions such as "provide close-up shots" of one or more of the media objects 110 in response to certain conditions (e.g., a significant moment during the event, such as a goal in a soccer game). The policies 126 can be defined before or during the events 112, the latter of which might allow one or more external entities to control, in real-time or near real-time, one or more of the camera nodes 108 in one or more of the camera arrays 104. These policies 126 might be separate from the inferences 124 to supplement any policies 126 already considered by the camera orchestration inference engine 122 in generating the inferences 124. Moreover, policies 126 applied to previous events 112 can be used in future events having the same or similar media objects 110 or media object 110 types. Other factors such as type of event 112, location 114, and the like also can be considered.

In some embodiments, the camera array orchestration system 102 can maintain, in memory, an aggregate of the state of collective camera states. The camera array orchestration system 102 can provide a graphical representation of the camera array 104 to applications and/or services, such as provided, at least in part, by the external entities 128, for further optimization.

The network 106 can be embodied as a single network or combination of multiple networks. More particularly, the network 106 can be or can include one or more wide area networks ("WANs"), local area networks ("LANs"), access networks, one or more core networks, one or more backbone networks, or some combination thereof. The network 106 can utilize any wired and/or wireless networking technologies. The network 106 also can be or can include the Internet, an intranet, an extranet, or some combination thereof. While aspects of the concepts and technologies disclosed herein are described in context of the network 106 being implemented using any or a combination of the certain technologies, those skilled in the art will appreciate the applicability of the concepts and technologies disclosed herein to other networking technologies. Accordingly, the concepts and technologies disclosed herein should not be construed as being limited to any particular networking technology.

The network 106, in some embodiments, is at least partially implemented on a software-defined networking ("SDN") framework. An SDN framework is an architectural framework for creating intelligent networks that are programmable, application-aware, and more open than traditional networks. SDN allows for the creation of multiple virtual network control planes on common hardware. SDN can help extend service virtualization and software control into many existing network elements. Moreover, SDN enables applications to request and to manipulate services provided by the network 106 and to allow the network 106 to expose network states back to applications. SDN exposes network capabilities through application programming interfaces ("APIs"), making the control of network equipment remotely accessible and modifiable via third-party software clients.

Figure 5:
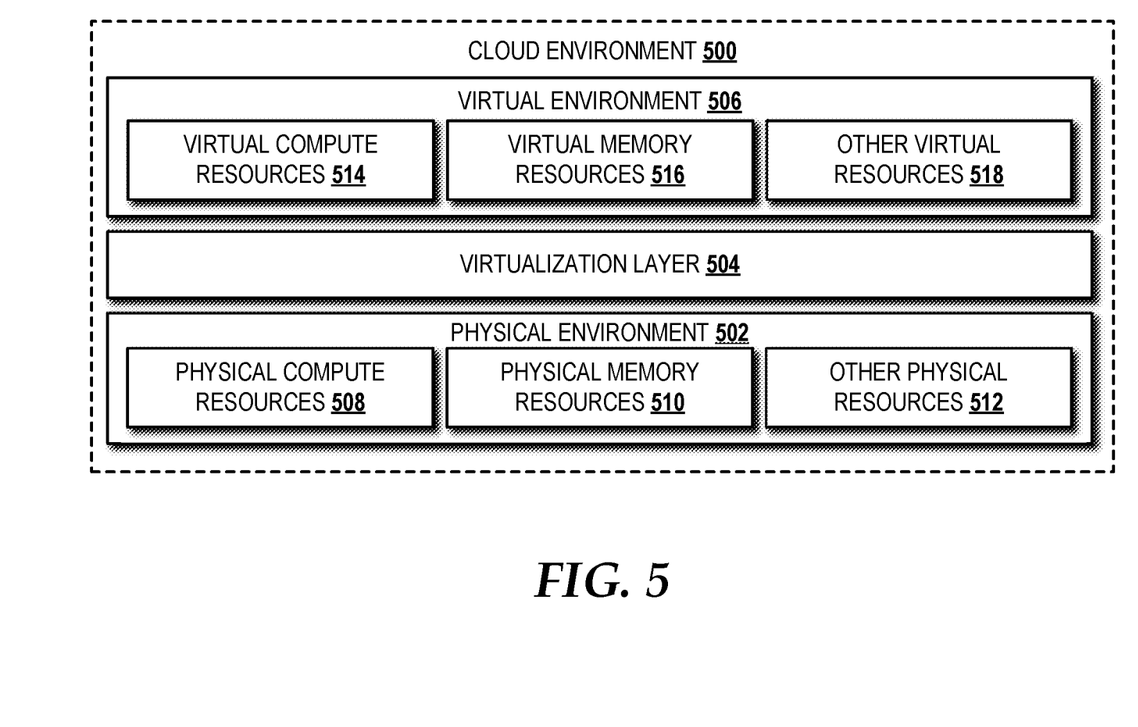
FIG. 5 is a block diagram illustrating aspects of an illustrative cloud environment capable of implementing aspects of the embodiments presented herein.

The camera array orchestration system 102, the camera arrays 104, the network 106, the camera nodes 108, or some combination thereof, can be implemented and/or controlled, at least in part, in/by a cloud environment 500 (best shown in FIG. 5). Briefly, the cloud environment 500 can include a plurality of hardware resources, including, for example, processing/compute resources, memory resources, and other resources such as input/output ("I/O") resources. These resources can be virtualized and managed by one or more virtual machine monitors ("VMMs") (also known as "hypervisors") to manage one or more virtual resources as abstractions of at least a portion of the hardware resources. These abstractions can be workloads, such as virtual machines ("VMs"). The camera array orchestration system 102, the camera arrays 104, the network 106, the camera nodes 108, or some combination thereof can be implemented, at least in part, on one or more VMs.

Figure 2:
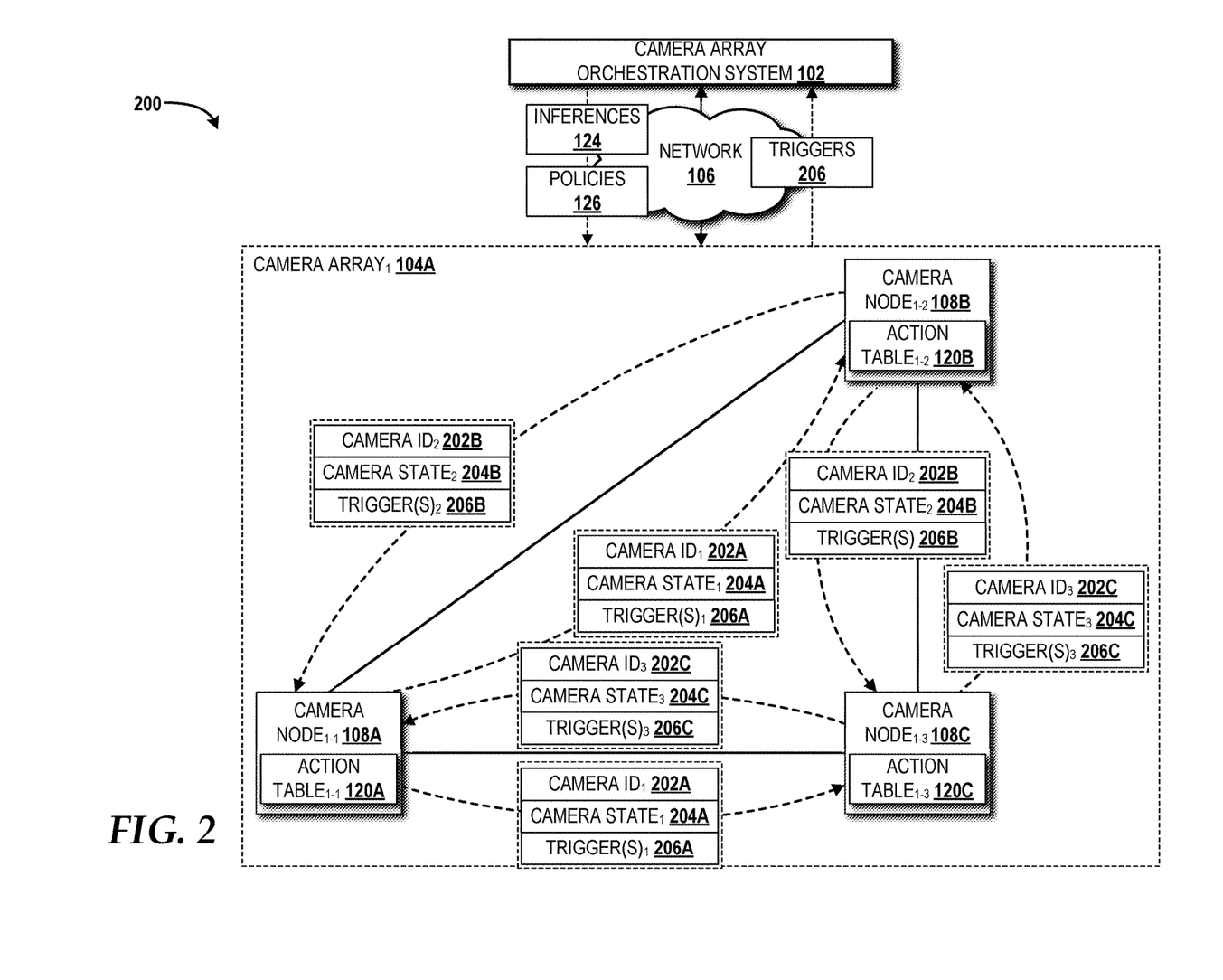
FIG. 2 is a block diagram illustrating aspects of an example camera array data flow, according to an illustrative embodiment.

Turning now to FIG. 2, a camera array data flow 200 will be described, according to an illustrative embodiment. The camera array data flow 200 illustrates the camera array$_1$ 104A, including the camera node$_{1-1}$ 108A with action table$_{1-1}$ 120A, the camera node$_{1-2}$ 108B with action table$_{1-2}$ 120B, and the camera node$_{1-3}$ 108C with action table$_{1-3}$ 120C. All of the camera nodes 108A-108C are in communication with the camera array orchestration system 102 via the network 106. The camera array data flow 200 illustrates an exchange of information among the camera nodes 108A-108C responsive to the inferences 124 and the policies 126 received from the camera array orchestration system 102. In the illustrated example, this information includes camera IDs 202A-202C (herein also referred to as camera IDs 202 and in the singular as a camera ID 202) that uniquely identify the camera nodes 108A-108C, camera states 204A-204C (herein also referred to as camera states 204 and in the singular as a camera state 204) that identify the current state of the camera nodes 108A-108C, and triggers 206A-206C (herein also referred to as triggers 206 and in the singular as a trigger 206) generated by the camera nodes 108A-108C and reported to the camera array orchestration system 102 for analysis.

The camera IDs 202A-202C uniquely identify the camera nodes 108A-108C, respectively. For example, the camera IDs 202A-202C might include letters, numbers, symbols, barcodes (e.g., 1D, 2D, or 3D), other encoded identifiers, hardware address(es) (e.g., MAC address), IP address(es), some combination thereof, or the like.

The camera states 204A-204C are used by the camera nodes 108A-108C to identify any relevant camera settings, including for example, resolution, frame rate, focus, zoom, aperture, angle, and like, in addition to any additional metadata, including statistics, about the media object(s) 110 currently recognized by the camera nodes 108A-108C.

The triggers 206A-206C are generated by the camera nodes 108A-108C, respectively, in response to recognizing one or more media objects 110. The triggers 206A-206C can identify the media object(s) 110 and can include any metadata known about the media object(s) 110. The camera nodes 108A-108C can share the triggers 206A-206C with each other and the camera array orchestration system 102. The camera array orchestration system 102 can respond to the triggers 206 with one or more of the policies 126 related to the media object(s) 110.

The camera nodes 108A-108C receive the inferences 124 and the policies 126 from the camera array orchestration system 102. The camera nodes 108A-108C use the inferences 124 and the policies 126 to create the action tables 120A-120C that are then used by the camera nodes 108A-108C to identify camera action(s) for capturing at least one of the media objects 110A-110N within the event$_1$ 112A (in the example shown in FIG. 1). As noted above, the camera actions can include pan-tilt-zoom controls, timing information (e.g., when the camera node 108 should begin and end capture of the media object(s) 110), and camera settings such as aperture, ISO, shutter speed, and the like. Other camera actions can be included in the action table 120.

In the illustrated camera array data flow 200, the camera node 108A can share the camera state 204A, the camera ID 202A, and the trigger(s) 206A with the camera nodes 108B-108C to inform the camera nodes 108B-108C of actions taken in accordance with the action table 120A. The camera nodes 108B-108C can use the camera state 204A to coordinate actions taken by the camera node 108A with actions taken by the camera nodes 108B-108C. Similarly, the camera nodes 108B-108C can share the camera states 204B-204C, the camera IDs 202B-202C, and the triggers 206B-206C with each other and the camera node 108A.

Figure 3:
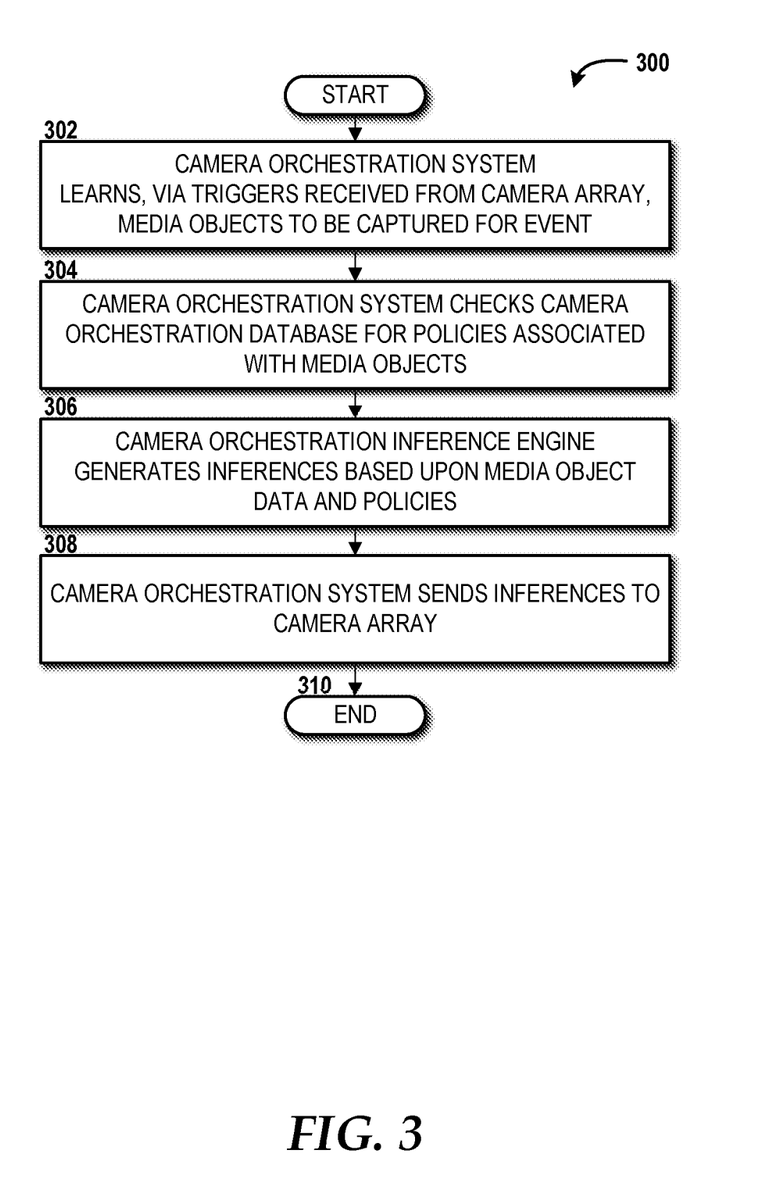
FIG. 3 is a flow diagram illustrating a method for orchestrating control of a camera array from the perspective of a camera array orchestration system, according to an illustrative embodiment.

Turning now to FIG. 3, a method 300 for orchestrating control of the camera array(s) 104 from the perspective of the camera array orchestration system 102 will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of one or more cloud environments, computing systems, devices, engines, controllers, or components disclosed herein to perform operations. It should be understood that the performance of one or more operations may include operations executed by one or more virtual processors at the instructions of one or more of the aforementioned hardware processors.

The method 300 will be described with additional reference to FIGS. 1 and 2. Moreover, the method 300 will be described in context of a single camera array 104 with any number of camera nodes 108 capturing any number of media objects 110 in association with a single event 112 that occurs within a single location 114. It should be appreciated that the method 300 can apply to multiple camera arrays 104 with any number of camera nodes 108 capturing any number of media objects 110 in association with multiple events 112 that occur within multiple locations 114.

The method 300 begins and proceeds to operation 302, where the camera array orchestration system 102 receives one or more triggers 206 from the camera array 104, and learns, based upon the trigger(s) 206, of the media objects 110 to be captured for the event 112. From operation 302, the method 300 proceeds to operation 304, where the camera array orchestration system 102 checks the camera orchestration database 118 for any policies 126 associated with the media objects 110. From operation 304, the method 300 proceeds to operation 306, where the camera orchestration inference engine 122 generates the inferences 124 based upon the media object data 116 and the policy(ies) 126. From operation 306, the method 300 proceeds to operation 308, where the camera array orchestration system 102 sends the inferences 124 to the camera array 104. From operation 308, the method 300 proceeds to operation 310, where the method 300 ends.

Figure 4:
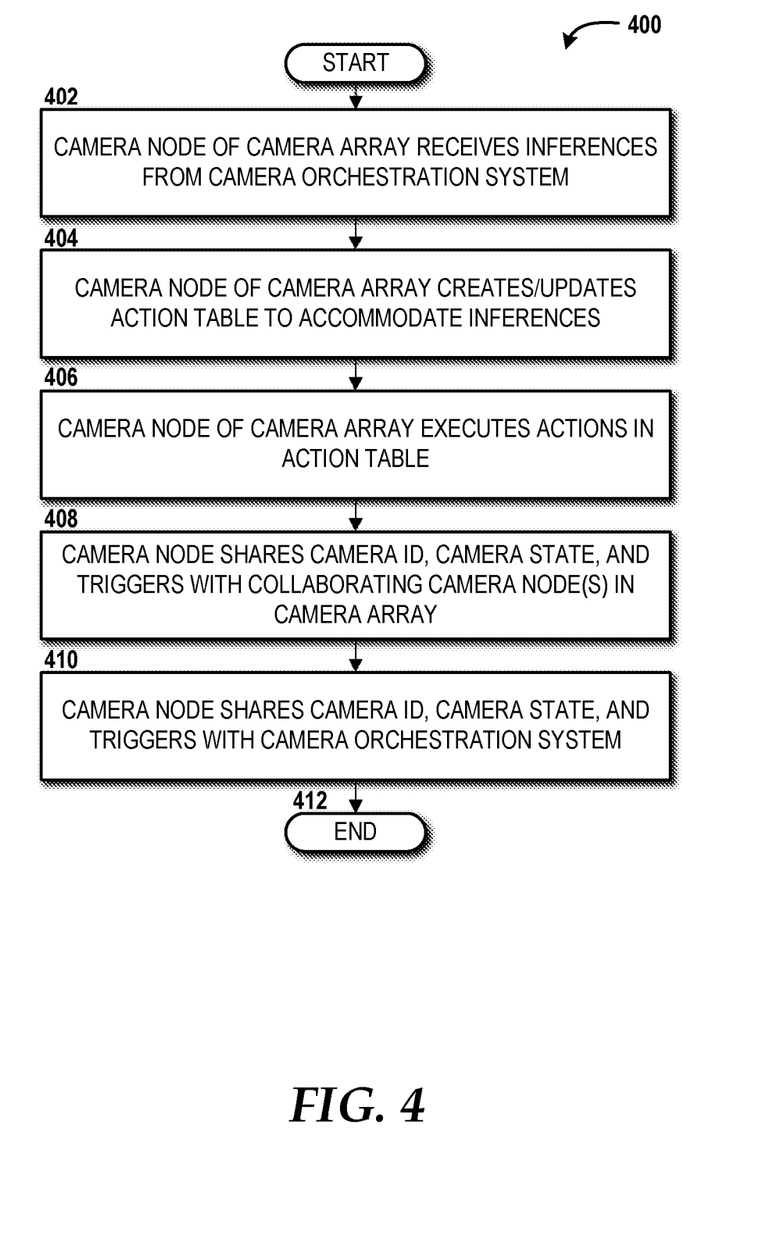
FIG. 4 is a flow diagram illustrating a method for orchestrating control of a camera array from the perspective of a camera node in the camera array, according to an illustrative embodiment.

Turning now to FIG. 4, a method 400 for orchestrating control of the camera array(s) 104 from the perspective of one camera node 108 in the camera array 104 will be described, according to an illustrative embodiment. The method will be described with additional reference to FIGS. 1 and 2. Moreover, the method 400 will be described in context of a single camera array 104 with any number of camera nodes 108 capturing any number of media objects 110 in association with a single event 112 that occurs within a single location 114. It should be appreciated that the method 300 can apply to multiple camera arrays 104 with any number of camera nodes 108 capturing any number of media objects 110 in association with multiple events 112 that occur within multiple locations 114.

The method 400 begins and proceeds to operation 402, where the camera node 108 receives the inferences 124 from the camera array orchestration system 102. From operation 402, the method 400 proceeds to operation 404, where the camera node 108 creates or updates the action table 120 associated with the camera node 108 to accommodate the inferences 124. In some embodiments, the inferences 124 specify one or more actions for the camera node 108 to include in the action table 120 with respect to one or more of the media objects 110. Alternatively, in some other embodiments, the camera node 108 (or a controller thereof) can create actions, based upon the inferences 124, for inclusion in the action tables 120.

From operation 404, the method 400 proceeds to operation 406, where the camera node 108 executes the action(s) in the action table 120. From operation 406, the method 400 proceeds to operation 408, where the camera node 108 shares the camera ID 202, the camera state 204, and the trigger(s) 206 with at least one other camera node 108 within the camera array 104. From operation 408, the method 400 proceeds to operation 410, where the camera node 108 shares the camera ID 202, the camera state 204, and the trigger(s) 206 with the camera array orchestration system 102. The camera array orchestration system 102 can use the trigger(s) 206 to continue the orchestration process, such as illustrated and described above with reference to FIG. 3. From operation 410, the method 400 proceeds to operation 412, where the method 400 ends.

Turning now to FIG. 5, an illustrative cloud environment 500 will be described, according to an illustrative embodiment. The camera array orchestration system 102, the camera arrays 104, the network 106, the camera nodes 108, or some combination thereof, can be implemented and/or controlled, at least in part, in/by the cloud environment 500.

The cloud environment 500 includes a physical environment 502, a virtualization layer 504, and a virtual environment 506. While no connections are shown in FIG. 5, it should be understood that some, none, or all of the components illustrated in FIG. 5 can be configured to interact with one other to carry out various functions described herein. In some embodiments, the components are arranged so as to communicate via one or more networks. Thus, it should be understood that FIG. 5 and the remaining description are intended to provide a general understanding of a suitable environment in which various aspects of the embodiments described herein can be implemented, and should not be construed as being limiting in any way.

The physical environment 502 provides hardware resources that, in the illustrated embodiment, include one or more physical compute resources 508, one or more physical memory resources 510, and one or more other physical resources 512. The physical compute resource(s) 508 can include one or more hardware components that perform computations to process data and/or to execute computer-executable instructions of one or more application programs, one or more operating systems, and/or other software.

The physical compute resources 508 can include one or more central processing units ("CPUs") configured with one or more processing cores. The physical compute resources 508 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 508 can include one or more discrete GPUs. In some other embodiments, the physical compute resources 508 can include CPU and GPU components that are configured in accordance with a co-processing CPU/GPU computing model, wherein the sequential part of an application executes on the CPU and the computationally-intensive part is accelerated by the GPU processing capabilities. The physical compute resources 508 can include one or more system-on-chip ("SoC") components along with one or more other components, including, for example, one or more of the physical memory resources 510, and/or one or more of the other physical resources 512. In some embodiments, the physical compute resources 508 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 508 can be or can include one or more hardware components architected in accordance with an ARM architecture, available for license from ARM HOLDINGS of Cambridge, United Kingdom. Alternatively, the physical compute resources 508 can be or can include one or more hardware components architected in accordance with an x86 architecture, such an architecture available from INTEL CORPORATION of Mountain View, Calif., and others. Those skilled in the art will appreciate the implementation of the physical compute resources 508 can utilize various computation architectures, and as such, the physical compute resources 508 should not be construed as being limited to any particular computation architecture or combination of computation architectures, including those explicitly disclosed herein.

The physical memory resource(s) 510 can include one or more hardware components that perform storage/memory operations, including temporary or permanent storage operations. In some embodiments, the physical memory resource(s) 510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 508.

The other physical resource(s) 512 can include any other hardware resources that can be utilized by the physical compute resources(s) 508 and/or the physical memory resource(s) 510 to perform operations described herein. The other physical resource(s) 512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 502 can be virtualized by one or more virtual machine monitors (not shown; also known as "hypervisors") operating within the virtualization layer 504 to create virtual resources that reside in the virtual environment 506. The virtual machine monitors can be or can include software, firmware, and/or hardware that alone or in combination with other software, firmware, and/or hardware, creates and manages virtual resources operating within the virtual environment 506.

The virtual resources operating within the virtual environment 506 can include abstractions of at least a portion of the physical compute resources 508, the physical memory resources 510, and/or the other physical resources 512, or any combination thereof, shown as virtual compute resources 514, virtual memory resources 516, and other virtual resources 518, respectively. In some embodiments, the abstractions can include one or more virtual machines upon which one or more applications can be executed.

Figure 6:
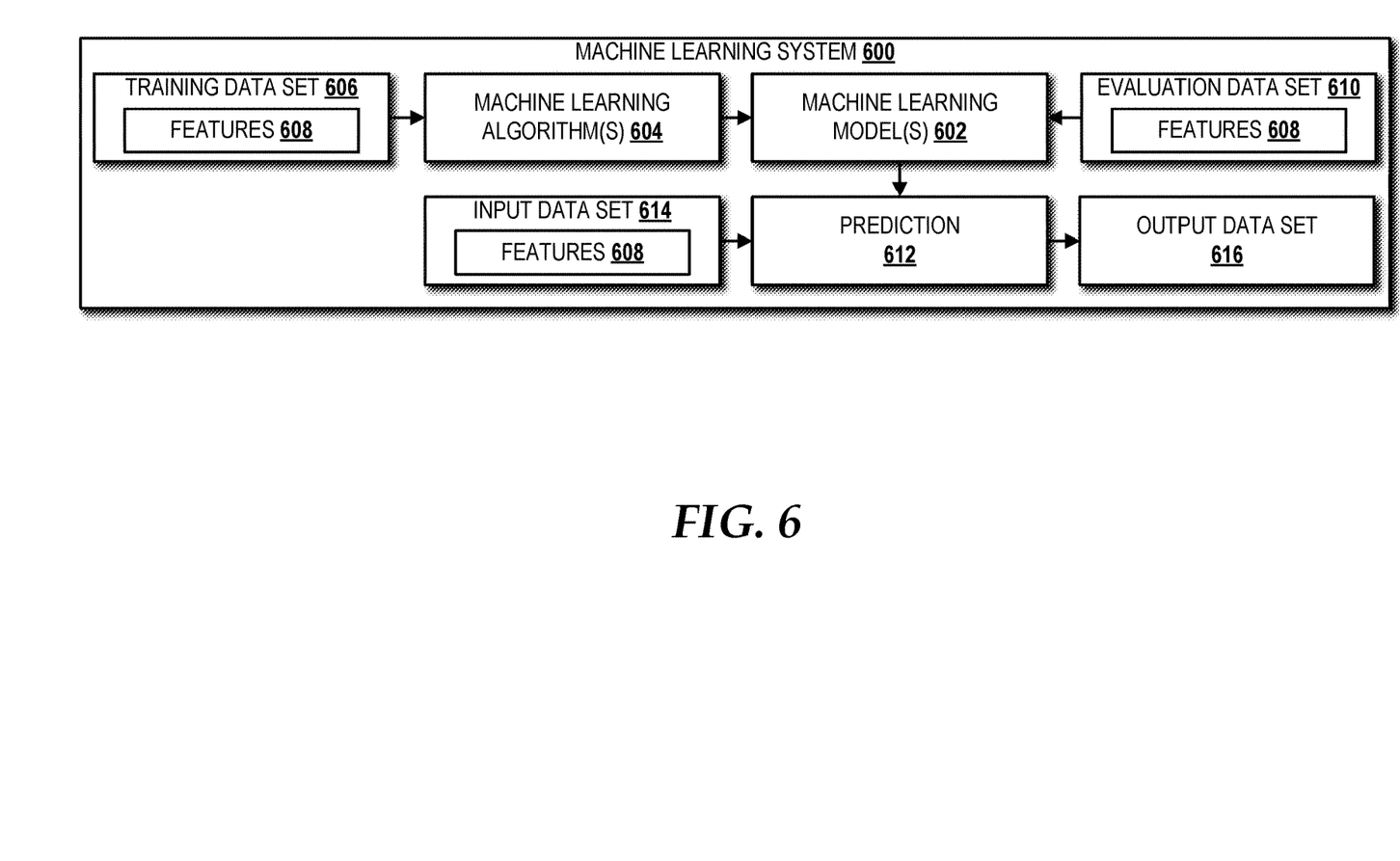
FIG. 6 is a block diagram illustrating aspects of an illustrative machine learning system capable of implementing aspects of the embodiments presented herein.

Turning now to FIG. 6, a block diagram illustrating a machine learning system 600 will be described, according to an illustrative embodiment. The machine learning system 600, in some embodiments, can be a software system executed, at least in part, by one or more processors described herein, such as in the cloud environment 500 illustrated and described herein with reference to FIG. 5 or a computer system 700 illustrated and described herein with reference to FIG. 7. The machine learning system 600 can be implemented as part of the camera array orchestration system 102. For example, the camera orchestration inference engine 122 can use the machine learning system 600 to generate the inferences 124 about the media objects 110 based upon the media object data 116 and the policies 126 (see FIG. 1).

The illustrated machine learning system 600 includes machine learning model(s) 602. The machine learning model(s) 602 can be created by the machine learning system 600 based upon one or more machine learning algorithms 604. The machine learning algorithm(s) 604 can be any existing, well-known algorithm, any proprietary algorithms, or any future machine learning algorithm. Some example machine learning algorithms 604 include, but are not limited to, gradient descent, linear regression, logistic regression, linear discriminant analysis, classification tree, regression tree, Naive Bayes, K-nearest neighbor, learning vector quantization, support vector machines, and the like. Those skilled in the art will appreciate the applicability of various machine learning algorithms 604 based upon the problem(s) to be solved by machine learning via the machine learning system 600.

The machine learning system 600 can control the creation of the machine learning models 602 via one or more training parameters. The training parameters can be manually or automatically selected based upon data provided in one or more training data sets 606 (e.g., the media object data 116). The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 604 converges to the optimal weights. The machine learning algorithm 604 can update the weights for every data example included in the training data set 606. The size of an update is controlled by the learning rate. A learning rate that is too high might prevent the machine learning algorithm 604 from converging to the optimal weights. A learning rate that is too low might result in the machine learning algorithm 604 requiring multiple training passes to converge to the optimal weights.

The model size is regulated by a number of input features ("features") 608 in the training data set 606. A greater the number of features 608 yields a greater number of possible patterns that can be determined from the training data set 606. The model size should be selected to balance the resources (e.g., compute, memory, storage, etc.) needed for training and the predictive power of the machine learning model 602.

The number of training passes indicates the number of training passes that the machine learning algorithm 604 makes over the training data set 606 during the training process. The number of training passes can be adjusted based, for example, on the size of the training data set 606, with larger training data sets being exposed to fewer training passes in consideration of time and/or resource utilization. The effectiveness of the machine learning model 602 can be increased by multiple training passes.

Data shuffling is a training parameter designed to prevent the machine learning algorithm 604 from reaching false optimal weights due to the order in which data contained in the training data set 606 is processed. For example, data provided in rows and columns might be analyzed first row, second row, third row, etc., and thus an optimal weight might be obtained well before a full range of data has been considered. By data shuffling, the data contained in the training data set 606 can be analyzed more thoroughly and mitigate bias in the machine learning model 602.

Regularization is a training parameter that helps to prevent the machine learning model 602 from memorizing training data from the training data set 606. In other words, the machine learning model 602 fits the training data set 606, but the predictive performance of the machine learning model 602 is not acceptable. Regularization helps the machine learning system 600 avoid this overfitting/memorization problem by adjusting extreme weight values of the features 608. For example, a feature 608 that has a small weight value relative to the weight values of the other features 608 in the training data set 606 can be adjusted to zero.

The machine learning system 600 can determine model accuracy after training by using one or more evaluation data sets 610 containing the same features 608 as in the training data set 606. This also prevents the machine learning model 602 from simply memorizing the data contained in the training data set 606. The number of evaluation passes made by the machine learning system 600 can be regulated by a target model accuracy that, when reached, ends the evaluation process and the machine learning model 602 is considered ready for deployment.

After deployment, the machine learning model 602 can perform prediction 612 with an input data set 614 having the same features 608 as in both the training data set 606 and the evaluation data set 610. The results of the prediction 612 are included in an output data set 616 consisting of predicted data. In accordance with the concepts and technologies disclosed herein the output data set 616 can include the inferences 124. The trigger(s) 206 can be used as part of the input data set 614. The features 608 can include metadata associated with the media objects 110.

Figure 7:
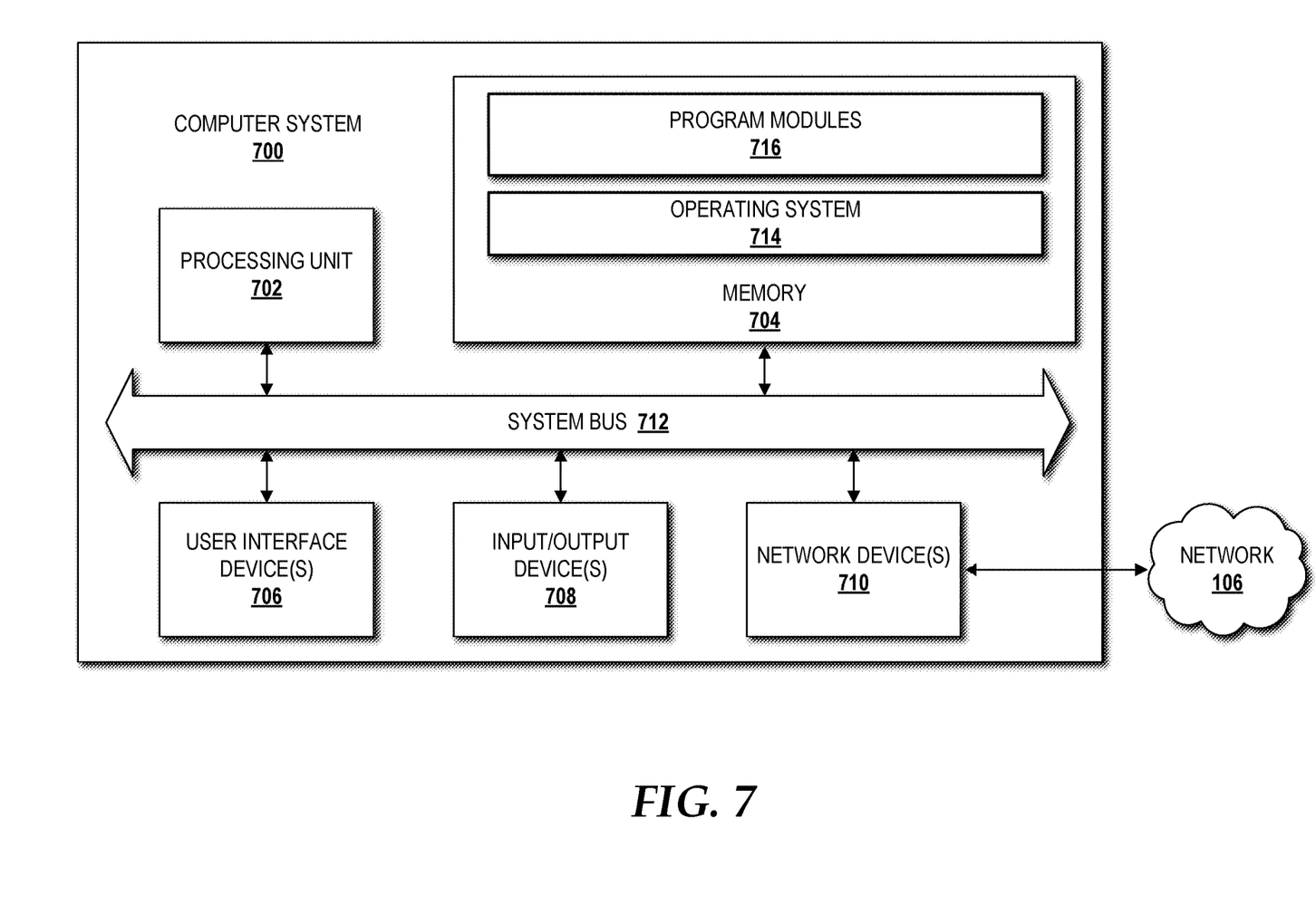
FIG. 7 is a block diagram illustrating an example computer system capable of implementing aspects of the embodiments presented herein.

Turning now to FIG. 7, a block diagram illustrating a computer system 700 configured to provide the functionality in accordance with various embodiments of the concepts and technologies disclosed herein. In some embodiments, the camera array orchestration system 102, the camera orchestration inference engine 122, the external entities 128, components of the network 106, and/or other elements disclosed herein can be configured, at least in part, like the architecture of the computer system 700. In some implementations, the physical environment 502 (illustrated in FIG. 5) includes one or more computers that are configured like the architecture of the computer system 700. The computer system 700 may provide at least a portion of the physical compute resources 508, the physical memory resources 510, and/or the other physical resources 512. It should be understood, however, that modification to the architecture may be made to facilitate certain interactions among elements described herein.

The computer system 700 includes a processing unit 702, a memory 704, one or more user interface devices 706, one or more input/output ("I/O") devices 708, and one or more network devices 710, each of which is operatively connected to a system bus 712. The bus 712 enables bi-directional communication between the processing unit 702, the memory 704, the user interface devices 706, the I/O devices 708, and the network devices 710.

The processing unit 702 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein. The physical compute resources 508 (illustrated in FIG. 5) can include one or more processing units 702.

The memory 704 communicates with the processing unit 702 via the system bus 712. In some embodiments, the memory 704 is operatively connected to a memory controller (not shown) that enables communication with the processing unit 702 via the system bus 712. The physical memory resources 510 (illustrated in FIG. 5) can include one or more instances of the memory 704. The illustrated memory 704 contains an operating system 714 and one or more program modules 716. The operating system 714 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 716 may include various software and/or program modules to perform the various operations described herein. The program modules 716 and/or other programs can be embodied in computer-readable media containing instructions that, when executed by the processing unit 702, perform various operations such as those described herein. According to embodiments, the program modules 716 may be embodied in hardware, software, firmware, or any combination thereof. In accordance with the concepts and technologies disclosed herein, the program modules 716 can include, at least in part, an implementation of the machine learning system 600 (illustrated in FIG. 6), such as embodied as part of the camera orchestration inference engine 122.

By way of example, and not limitation, computer-readable media may include any available computer storage media or communication media that can be accessed by the computer system 700. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 700. In the claims, the phrase "computer storage medium" and variations thereof does not include waves or signals per se and/or communication media.

The user interface devices 706 may include one or more devices with which a user accesses the computer system 700. The user interface devices 706 may include, but are not limited to, computers, servers, PDAs, cellular phones, or any suitable computing devices. The I/O devices 708 enable a user to interface with the program modules 716. In one embodiment, the I/O devices 708 are operatively connected to an I/O controller (not shown) that enables communication with the processing unit 702 via the system bus 712. The I/O devices 708 may include one or more input devices, such as, but not limited to, a keyboard, a mouse, or an electronic stylus. Further, the I/O devices 708 may include one or more output devices, such as, but not limited to, a display screen or a printer. In some embodiments, the I/O devices 708 can be used for manual controls for operations to exercise under certain emergency situations.

The network devices 710 enable the computer system 700 to communicate with other networks or remote systems via the network 106. Examples of the network devices 710 include, but are not limited to, a modem, a radio frequency ("RF") or infrared ("IR") transceiver, a telephonic interface, a bridge, a router, or a network card. The network 106 may include a wireless network such as, but not limited to, a wireless LAN ("WLAN"), a wireless WAN ("WWAN"), a wireless personal area network ("WPAN") such as provided via BLUETOOTH technology, a wireless metropolitan area network ("WMAN") such as a WiMAX network or metropolitan cellular network. Alternatively, the network 106 may be a wired network such as, but not limited to, a wired WAN, a wired PAN, or a wired Metropolitan Area Network ("MAN"). The network 718 may be any other network described herein.

Figure 8:
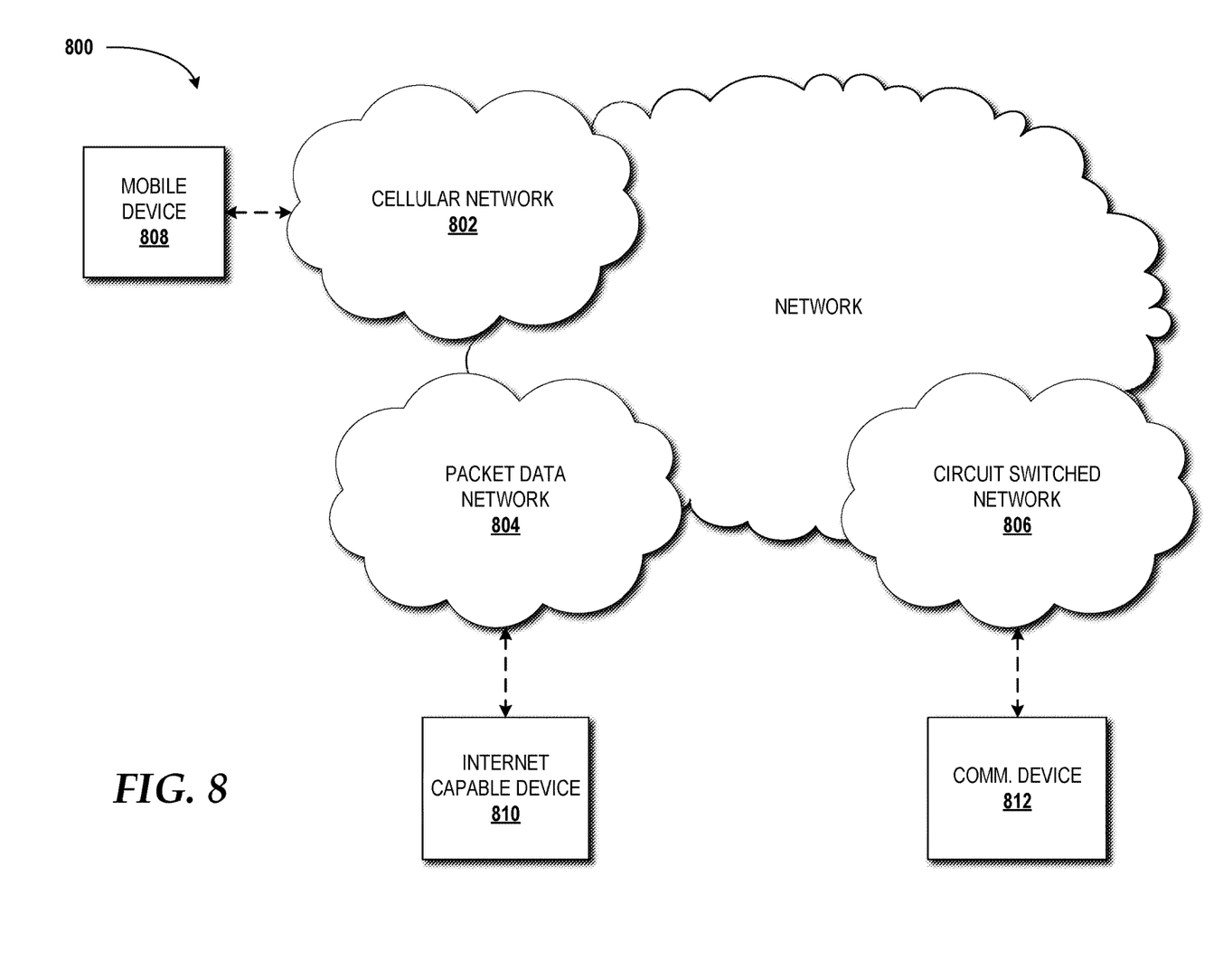
FIG. 8 is a diagram illustrating a combined network overview, according to an illustrative embodiment.

Turning now to FIG. 8, details of a combined network overview 800 are illustrated, according to an illustrative embodiment. In some embodiments, the network 106 (illustrated in FIG. 1) can be implemented, at least in part, like the combined network overview 800.

The combined network overview 800 includes a cellular network 802, a packet data network 804, for example, the Internet, and a circuit switched network 806, for example, a public-switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, video data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a Global System for Mobile communications ("GSM") network and can provide data communications via General Packet Radio Service ("GPRS") and/or Enhanced Data rates for GSM Evolution ("EDGE"). Additionally, or alternatively, the cellular network 802 can be configured as a 3G Universal Mobile Telecommunications Service ("UMTS") network and can provide data communications via the High-Speed Packet Access ("HSPA") protocol family, for example, High-Speed Downlink Packet Access ("HSDPA"), High-Speed Uplink Packet Access ("HSUPA") (also known as Enhanced Uplink ("EUL")), and HSPA+. The cellular network 802 also is compatible with 4G mobile communications standards such as Long-Term Evolution ("LTE"), or the like, as well as evolved and future mobile standards.

The packet data network 804 includes various devices, for example, servers, computers, databases, routers, packet gateways, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system ("POTS"). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough the packet data network 804 and/or the cellular network 802. It should be appreciated that the communications device 812 can be an Internet-capable device, and can be substantially similar to the Internet-capable device 810. In the specification, the network is used to refer broadly to any combination of the networks 802, 804, 806.

Based on the foregoing, it should be appreciated that concepts and technologies directed to camera array orchestration have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A camera array orchestration system comprising:
   a processor; and
   memory comprising instructions that, when executed by the processor, cause the processor to perform operations comprising
      receiving a first trigger from a camera array, wherein the camera array comprises a first camera node and a second camera node, and wherein the first trigger is generated by the first camera node in response to recognizing a media object associated with an event,
      learning, based upon the first trigger, of the media object to be captured for the event,
      generating an inference about the media object, wherein the inference is to be used by the first camera node of the camera array to create a first action specific to the first camera node and for use by the first camera node to capture the media object during the event, and wherein the inference is also to be used by the second camera node of the camera array to create a second action specific to the second camera node and for use by the second camera node to capture the media object during the event, sending the inference to the camera array, wherein the first camera node creates, based, at least in part, upon the inference, the first action and stores the first action in a first action table associated with the first camera node, and wherein the second camera node creates, based, at least in part, upon the inference, the second action and stores the second action in a second action table associated with the second camera node, receiving a second trigger from the camera array, wherein the second trigger is generated by the second camera node, and updating the inference based upon the second trigger.

2. The camera array orchestration system of claim 1, wherein the processor and the memory are physical hardware resources of a cloud environment.

3. The camera array orchestration system of claim 1, wherein the processor and the memory are virtualized hardware resources executed by physical hardware resources of a cloud environment.

4. The camera array orchestration system of claim 1, wherein the first trigger comprises data that identifies the media object.

5. The camera array orchestration system of claim 4, wherein the operations further comprise checking a camera orchestration database for a policy associated with the media object identified by the data.

6. The camera array orchestration system of claim 5, wherein generating the inference comprises generating the inference based, at least in part, upon the policy.

7. The camera array orchestration system of claim 6, wherein generating the inference based, at least in part, upon the policy comprises generating, by a camera orchestration inference engine comprising a machine learning system, the inference based, at least in part, upon the policy.

8. A method comprising:
receiving, by a camera array orchestration system comprising a processor, a first trigger from a camera array, wherein the camera array comprises a first camera node and a second camera node, and wherein the first trigger is generated by the first camera node in response to recognizing a media object associated with an event;

learning, by the camera array orchestration system, based upon the first trigger, of the media object to be captured for the event;

generating, by the camera array orchestration system, an inference about the media object, wherein the inference is to be used by the first camera node of the camera array to create a first action specific to the first camera node and for use by the first camera node to capture the media object during the event, and wherein the inference is also to be used by the second camera node of the camera array to create a second action specific to the second camera node and for use by the second camera node to capture the media object during the event;

sending, by the camera array orchestration system, the inference to the camera array, wherein the first camera node creates, based at least in part, upon the inference, the first action and stores the first action in a first action table associated with the first camera node, and wherein the second camera node creates, based, at least in part, upon the inference, the second action and stores the second action in a second action table associated with the second camera node;

receiving a second trigger from the camera array, wherein the second trigger is generated by the second camera node; and updating the inference based upon the second trigger.

9. The method of claim 8, wherein the first trigger comprises data that identifies the media object.

10. The method of claim 9, further comprising checking a camera orchestration database for a policy associated with the media object identified by the data.

11. The method of claim 10, wherein generating the inference comprises generating the inference based, at least in part, upon the policy.

12. The method of claim 11, wherein generating the inference based, at least in part, upon the policy comprises generating, by a camera orchestration inference engine comprising a machine learning system, the inference based, at least in part, upon the policy.

13. The method of claim 12, further comprising:
receiving, by the first camera node of the camera array, the inference;
creating, by the first camera node, the first action and storing the first action in the first action table;
executing, by the first camera node, the first action; and
sharing, by the first camera node, with at least the second camera node of the camera array, a first camera ID that identifies the first camera node, a first camera state of the first camera node, and the first trigger.

14. The method of claim 8, further comprising:
sharing, by the first camera node, with the second camera node, a first camera ID that identifies the first camera node, a first camera state of the first camera node, and the first action; and
sharing, by the second camera node, with the first camera node, a second camera ID that identifies the second camera node, a second camera state of the second camera node, and the second action.

15. The method of claim 12, further comprising:
receiving, by the second camera node of the camera array, the inference;
creating, by the second camera node, the second action and storing the second action in the second action table;
executing, by the second camera node, the second action; and
sharing, by the second camera node, with at least the first camera node of the camera array, a second camera ID that identifies the second camera node, a second camera state of the second camera node, and the second trigger.

16. A computer-readable storage medium comprising computer-executable instructions that, when executed by a processor, causes the processor to perform operations comprising:
receiving a first trigger from a camera array, wherein the camera array comprises a first camera node and a second camera node, and wherein the first trigger is generated by the first camera node in response to recognizing a media object associated with an event;
learning, based upon the first trigger, of the media object to be captured for the event;
generating an inference about the media object, wherein the inference is to be used by the first camera node of the camera array to create a first action specific to the first camera node and for use by the first camera node to capture the media object during the event, and wherein the inference is also to be used by the second camera node of the camera array to create a second action specific to the second camera node and for use by the second camera node to capture the media object during the event;

sending the inference to the camera array, wherein the first camera node creates, based, at least in part, upon the inference, the first action and stores the first action in a first action table associated with the first camera node, and wherein the second camera node creates, based, at least in part, upon the inference, the second action and stores the second action in a second action table associated with the second camera node;

receiving a second trigger from the camera array; and updating the inference based upon the second trigger.

17. The computer-readable storage medium of claim 16, wherein the processor is a physical hardware resource of a cloud environment.

18. The computer-readable storage medium of claim 16, wherein the processor is a virtualized hardware resource executed by a physical hardware resource of a cloud environment.

19. The computer-readable storage medium of claim 16, wherein the first trigger comprises data that identifies the media object; and wherein the operations further comprise checking a camera orchestration database for a policy associated with the media object identified by the data.

20. The computer-readable storage medium of claim 19, wherein generating the inference comprises generating the inference based, at least in part, upon the policy.

* * * * *